Patented Aug. 24, 1948

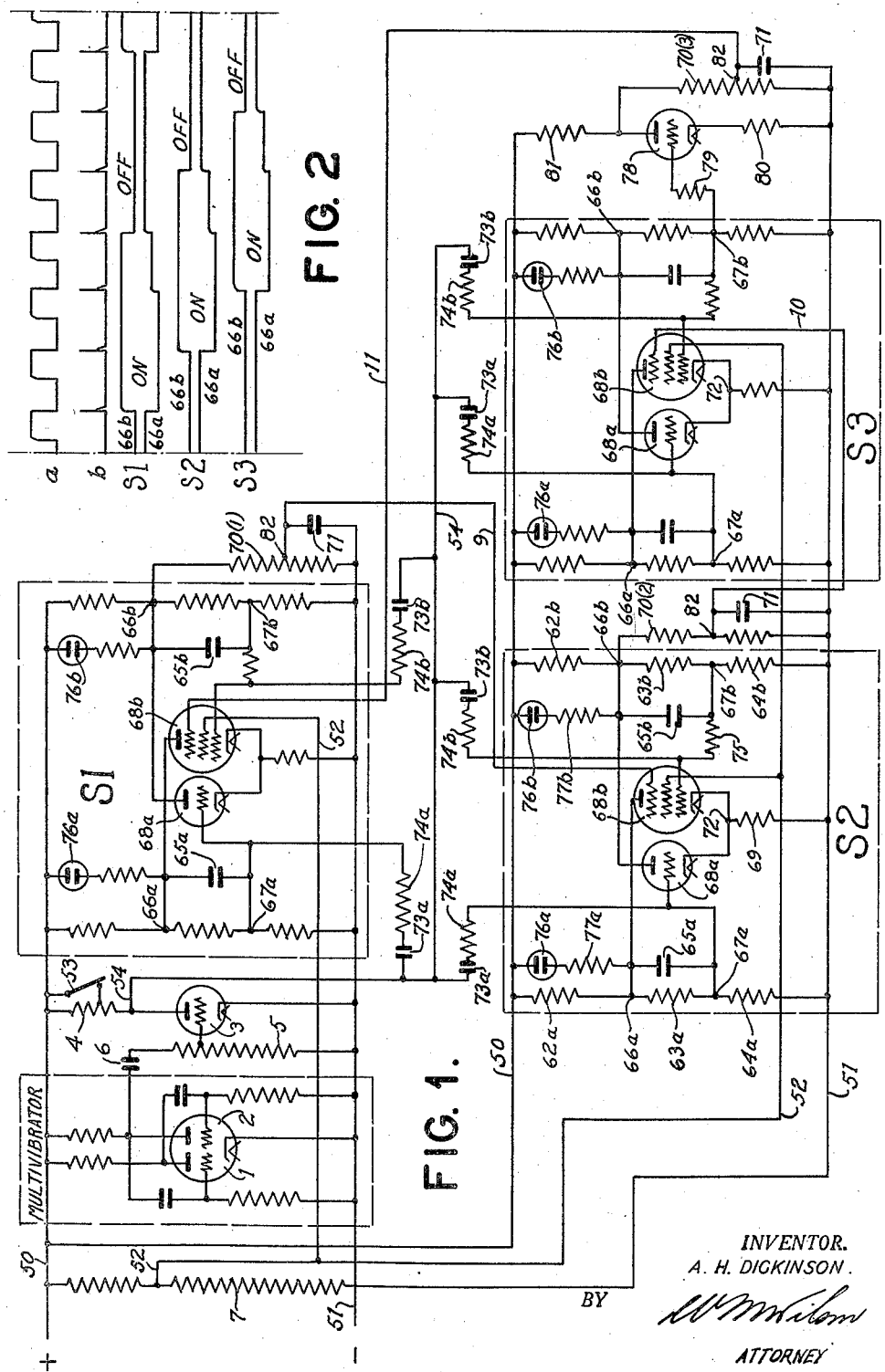

2,447,800

UNITED STATES PATENT OFFICE 2,447,800

SEQUENTIAL ELECTRONIC COMMUTATOR WITH SUPPLEMENTARY GRID CONTROL

Arthur H. Dickinson, Greenwich, Conn., assignor to International Business Machines Corporation, New York, N. Y., a corporation of New York Application April 10, 1945, Serial No. 587,581

7 Claims. (Cl. 250—27)

This case relates to an electronic commutator or the like for producing pulses which may be utilized for various purposes.

An object of the invention is to provide an electrical system which includes a trigger circuit having a single conditioning portion which in one condition prepares the circuit to be tripped in one direction, from one state to a reverse state, and which in an alternate condition prepares the circuit to be tripped in the reverse direction, from the reverse state to the other state.

An object of the invention is to provide an electronic commutator which includes a series of electronic trigger circuits coupled in cascade so that each circuit in either of two, alternate states acts upon a single conditioning portion of the next circuit to condition this next circuit for selective tripping, by an electrical pulse, to either of such states, depending on the state of the preceding circuit.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 shows the circuits of an exemplary commutator embodying my invention.

Fig. 2 diagrammatically shows the timing relation of potentials produced at various points of the circuits.

The oscillator and amplifier

Pulses for operating the electronic commutator are derived from a suitable oscillator. The one used here is a conventional multivibrator shown in Fig. 1. It is connected across plus line 50 and minus line 51 which receive D. C. potential from a suitable source. Operation of the multivibrator being well understood, it is sufficient to point out that square-topped voltage waves are continually produced at the anode of tube 1 which are 180 degrees out of phase with such waves continually produced on the anode of tube 2. The base frequency of the multivibrator is adjusted according to the desired rate of commutator operation.

Descending portion of the voltage waves at the output of tube 2 will be converted and amplified into sharp positive pulses of steep wave front. Fig. 2, line a indicates the general form of the voltage waves developed at the output of tube 2 and Fig. 2, line b indicates the general form of the positive pulses derived therefrom. To obtain these positive pulses, means including a triode 3 is provided. The anode of 3 is connected by a load resistor 4 to line 50 and its cathode is connected to line 51. The grid of tube 3 taps a resistor 5 which is coupled by a condenser 6 to the anode of tube 2. The time constant of the circuit coupling the anode of tube 2 to the grid of tube 3 is made so small that the square waves of voltage at the anode of tube 2 are converted into sharp positive and negative pulses on the grid of tube 3. Both the cathode of tube 3 and the resistor 5 terminate at line 51 so that the grid bias of 3 normally is zero and the tube is fully conductive. Hence, positive pulses on the grid of tube 3 are without effect and are quenched. On the other hand, the negative pulses increase the impedance of tube 3 so that amplified positive pulses such as indicated in Fig. 2, line b are developed at the anode of the tube. The anode of tube 3 is connected to a wire 54 which receives these pulses. The amplitude of the pulses depends on the value of the load resistor 4. With switch 53 closed and shorting a portion of the resistor 4, the pulse amplitude is low and ineffective to operate the commutator. But with switch 53 open, the pulse amplitude is greater and of operating amplitude. Pulses of operating amplitude may hereinafter be called operating pulses.

The commutator has a number of stages proportional to the number of progressive changes in electrical effects to be produced by the commutator in a cycle. As illustrative, three stages are used. These are designated S1, S2, and S3. They are interconnected in a closed chain to operate in the order S1, S2, S3, S1, S2, etc. Each stage comprises a novel trigger circuit which is described below.

The trigger circuit

This circuit has alternate, self-maintained stable states. It may be tripped from either state to the other by applying an electrical unbalancing force. Specifically, the pulses of operating amplitude appearing on wire 54 will provide the unbalancing force but will be effective only if the circuit has been pre-conditioned for triggering action. Pre-conditioning of one trigger circuit will be under control of the circuit preceding it in the sequence of commutator operation.

In detail, each trigger circuit has a left hand impedance network or branch and a right hand impedance network or branch. The left hand branch includes resistors 62a, 63a, and 64a in series across the lines 50 and 51. The right hand branch includes corresponding resistors 62b, 63b, and 64b. A condenser 65a is in shunt with resistor 63a and a corresponding condenser 65b shunts resistor 63b. A variable impedance, three-element vacuum tube 68a has its anode connected to the junction point 66b of resistors 62b and 63b and its cathode connected via a common resistor 69 to line 51. Thus, the anode-cathode circuit of 68a is in parallel with resistors 63b and 64b, whereby 68a may be viewed as a variable impedance portion of the right hand impedance branch. A variable impedance, multi-grid vacuum tube; specifically, the pentode 68b has its anode connected to the junction point 66a of resistors 62a and 63a and its cathode connected by common resistor 69 to line 51. Hence, the anode-cathode circuit of 68b is in parallel with resistors 63a and 64a, so that 68b may be considered a variable impedance element of the left hand impedance branch. The screen grids of the pentodes of all the trigger circuits are connected to a common line 52 which receives voltage intermediate the voltage across lines 50 and 51 by means of a voltage divider 7. The connections to the suppressor grids of the pentodes will be explained presently. The grid of tube 68a is connected to junction point 67a of resistors 63a and 64a while the control grid, hereinafter called grid, of pentode 68b is connected by a resistor 75 to junction point 67b of resistors 63b and 64b. In this manner, cross-coupling between the left and right hand impedance branches is obtained, so that electrical conditions in either branch will be a function of the electrical conditions in the other branch.

The resistors 62a, 63a and 64a and condenser 65a are respectively equal in value to resistors 62b, 63b and 64b and condenser 65b. An efficient arrangement is one in which each of the resistors numbered 62 and 64 is one-third the value of each of the resistors numbered 63 and in which condensers 65a and 65b each have a capacitance in the order of a few hundred micromicrofarads. In either state of stability of the circuit, one of the tubes 68a and 68b is conductive while the other is at cut-off, so that the point 72 at the upper end of common resistor 69 remains at substantially constant potential, which may be called the cathode potential. The resistor 69 has such value that the potential drop across it is substantially equal to the maximum potential drop which may exist across either resistor 64a or 64b. In other words, when the potential drop across resistor 64a is at maximum, the potential of point 67a, and of the connected grid of tube 68a, is substantially equal to cathode potential. The tube 68a is then at zero grid bias and is highly conductive or at low impedance. When the voltage drop across resistor 64b is at maximum, point 67b and the connected grid of the pentode 68b are substantially at cathode potential. Pentode 68b is then at substantially zero grid bias and is conductive or at low impedance. If, at the same time, the suppressor of the pentode is at high potential, the pentode is at maximum conductivity or minimum impedance. But if at the time the grid bias of the pentode is substantially zero, the suppressor potential is reduced, then the conductivity of the pentode is less than its maximum and its impedance is above its minimum value. If the grid bias of the pentode is negative and of such value as to maintain the pentode at cut-off, a rise or fall in potential of the suppressor will have no effect. The potential of the suppressor in each trigger circuit is determined by the potential of a connected point 82 of a resistor 70 associated with the preceding circuit. This point 82 may be either at high or low potential, whereby the connected suppressor may be either at high or low potential. The low suppressor potential is considerably negative with respect to cathode potential and the high suppressor potential is about equal to cathode potential. When the negative grid bias is at cut-off value, the high suppressor potential will not unblock the pentode but it will condition the pentode to be unblocked upon application to the grid of a positive pulse of operating amplitude by a circuit coupling the grid to the wire 54. But if the suppressor potential is then at its low value, the application of an operating pulse to the grid will be ineffective to unblock the pentode. Thus, the suppressor potential selectively conditions the pentode for response to an operating pulse received by its grid from wire 54. The pentode is in fully conductive status when its suppressor and grid potentials both are at high value, substantially equal to cathode potential. Under this condition, a reduction in potential of the suppressor to its low value will reduce current flow in the pentode but will not block current flow.

When the pentode 68b is at maxium conductivity, there is large current flow from line 50 through the pentode and resistor 69 to line 51, whereby the potential at point 66a will then be only slightly higher than cathode potential. The potential drop across resistor 63a will then force the potential at point 67a considerably below cathode potential and the negative grid bias of tube 68a will be so high as to maintain this tube at cut-off. Operating pulses fed to the point 67a from wire 54 then will be ineffective to reduce the negative grid bias of tube 68a sufficiently to drive it to conductivity. But if the suppressor potential of pentode 68b is reduced to its low value, the current flow through the pentode will be reduced, although not blocked. Upon such reduction in current flow through the pentode, point 66a and, therefore, point 67a will rise in potential to some extent. This rise in potential of point 67a will reduce the negative grid bias of tube 68a but not sufficiently to start current flow therethrough. But if, with this preliminary reduction in grid potential of the tube 68a having been effected, an operating pulse is received by the grid of 68a from wire 54, then there will be a further reduction in negative grid bias of 68a sufficient to unblock the tube. Thus, the suppressor potential of the pentode 68b will indirectly, selectively condition the triode 68a for response to an operating pulse received by its grid from wire 54.

As may now be clear, the suppressor potential of pentode 68b will selectively determine whether the operating pulses received from wire 54 shall be effective upon either impedance branch of the trigger circuit. When the suppressor potential is high, it conditions the pentode to be unblocked by an operating pulse and, thereby, enables such pulse to be effective to reduce the impedance of the left hand impedance branch which contains the pentode. When the suppressor potential is low, it conditions the triode 68a to be unblocked by an operating pulse and, thereby, enables such pulse to be effective to reduce the impedance of the right hand impedance branch which contains the triode. Since the pentode is a part of the left hand impedance branch, it may be stated that the electrical status of a portion of one of the branches of the trigger circuit selectively conditions both branches of the circuit for changes in impedance. Specifically, the potential upon one electrode (the suppressor) of one tube (68b) in the trigger circuit selectively controls the effectiveness of a tripping pulse tending to reverse the status of the circuit.

The trigger circuit is in one stable state when its left hand branch is at low impedance while its right hand branch is at high impedance. Purely for convenience, this state of the circuit may be called its on state. The circuit is in the reverse or off stable state when its left hand branch is at high impedance and its right hand branch is at low impedance. The cross-coupling between the branches is such that with either branch at low impedance, the other branch is necessarily at high impedance. The off state of stability in which the right hand branch is at low impedance and the left hand branch at high impedance will now be explained further.

Assuming that the voltage drops across resistors 64a and 69 of the trigger circuit are equal, then point 67a is at the potential of point 72 and the grid bias of tube 68a is zero. Under this condition, tube 68a is highly conductive or at low impedance and there is large current flow from line 50 through resistor 62b, the tube 68a and the resistor 69 to line 51. Under this condition, the anode of tube 68a (and the point 66b) has a potential only slightly above that of point 72. The resulting potential drop across resistors 63b and 64b is great enough to maintain the point 67b (also the grid of tube 68b) sufficiently negative with respect to point 72 to hold the tube 68b at cut-off for the voltage applied to its screen and for any of the voltages which may be applied to its suppressor. With the tube 68b at cut-off, its impedance is high and its anode (also point 66a) has a potential high enough so that the drop in potential across resistors 63a and 64a will not force the potential at point 67a (also the grid of tube 68a) below that of point 72. Tube 68a will thus be maintained at low impedance while 68b is maintained at high impedance. Points 66a and 67a are then at sustained high potentials and points 66b and 67b at sustained low potentials. In short, the right hand branch is at low impedance while the left hand branch is at high impedance. This defines the off state of stability of the trigger circuit. The manner of switching the circuit to the on state of stability will now be described.

Before the circuit can be switched to the on state, the suppressor potential of its pentode 68b must be brought to its upper value as only then will the reduction in negative grid bias of the pentode by an operating pulse be effective to unblock the pentode, as previously explained. As long as the potential of the suppressor is at its lower value, the reduction in negative grid bias of the pentode by an operating pulse will be ineffective and the pentode will stay at cut-off. Under this condition, the trigger circuit will not be tripped to the on state in response to an operating pulse received by the grid of the pentode. Let it be assumed that the suppressor potential has been increased to its upper value. Hence, the first following operating pulse received by the grid of pentode 68b will increase the voltage drop across resistors 75 and 64b. As a result, the potential of the grid of 68b will rise with respect to that of line 51, thereby decreasing the potential difference between the grid and the cathode of 68b. This reduction in negative grid bias of the pentode 68b, in conjunction with the increased suppressor potential, is effective to start current flow through the pentode. Thereupon point 66a suddenly drops in potential and a negative pulse is transferred by condenser 65a to the point 67a, causing it to become negative with respect to the cathode. Thus, the negative grid bias of tube 68a is increased, reducing current flow therethrough. As a result, point 66b suddenly rises in potential and a positive pulse is transferred by condenser 65b to the grid of tube 68b. This positive pulse fed through condenser 65b promotes the decrease in the negative grid bias of 68b which was initiated by the operating pulse from wire 54 applied to the grid of 68b. The ultimate result of the interaction of the two impedance branches is that the grid of the tube 68b is brought to its high potential, substantially equal to cathode potential, while the grid of tube 68a is driven to cut-off potential. The trigger circuit has now been switched from off to on state. In the on state, the tube 68a is at cut-off and the tube 68b is conductive, and points 66a and 67a are at low potential while points 66b and 67b are at high potential. In other words, the left hand branch of the circuit is at low impedance and the right hand branch is at high impedance, which defines the on state of the circuit.

As previously explained, pentode 68b is at maximum conductivity when its grid and suppressor potentials are both at their high value, about equal to cathode potential. This is the case when the circuit is first switched to the on status in the manner just described. Thereafter, a reduction in potential of the suppressor will occur, for reasons explained in the next section, reducing the conductivity of the pentode to a preliminary extent. The pentode, however, will not be driven to cut-off as long as the grid bias stays substantially at zero value. Thus, the reduction in suppressor potential does not cause the circuit to be triggered back to its former, off status, but it does condition the circuit for such operation in response to the next operating pulse fed from wire 54 to the grid of the tube 68a. The preliminary increase in impedance of tube 68b results in a preparatory or conditioning reduction in negative grid bias of the tube 68a. After this, the first operating pulse applied to the grid of 68a further increases the voltage drop across resistor 64a, whereby the negative grid bias of 68a is reduced further and sufficiently to start current flow through 68a. Thereupon, point 66b drops suddenly in potential, whereby a negative pulse is transferred by condenser 65b to the grid of tube 68b, making the grid bias of this tube negative. Impedance of 68b rises further, causing a related rise in potential of point 66a. The resulting positive pulse is fed by condenser 65a to the grid of tube 68a, promoting the decrease in its negative grid bias. Such interactions between the two impedance branches are cumulative and ultimately the grid bias of tube 68a is driven to zero while that of tube 68b is driven to negative, cut-off value. Tube 68a is then at maximum conductivity or minimum impedance while tube 68b is at minimum conductivity and maximum impedance. Points 66a and 67a are at high potential and points 66b and 67b at low potential. In short, the left hand branch is at high impedance and the right hand branch at low impedance, so that the circuit has been tripped back from on state to off state.

Glow discharge tubes 76a and 76b are provided to visually indicate the status of the circuit. The tube 76a and a current limiting resistor 77a are in series between point 66a and line 50, and tube 76b and resistor 77b are connected between point 66b and line 50. When the circuit is in the on state in which its point 66a is at low potential, there is sufficient difference in potential across the tube 76a to light it. Similarly, if the circuit is in the off status, in which point 66b is a low potential, then tube 76b is lit. Thus, if the tube 76a is lit, it indicates that the circuit is in the on state, but if the tube 76b is lit, it indicates that the circuit is in off state.

The pulses on wire 54 are fed through coupling circuits to the grids of the tubes 68a and 68b of all the trigger circuits simultaneously. The coupling circuit between the grid of each tube 68a and the wire 54 includes a condenser 73a and a resistor 74a. The coupling circuit between each tube 68b and the wire 54 includes a condenser 73b and a resistor 74b. Although each pulse is impressed upon the grids of both tubes of each trigger circuit simultaneously, it is selectively effective depending upon the preliminary conditioning described before. This preliminary conditioning is controlled by the potential on one control electrode of one electron tube in each trigger circuit; specifically by the potential on the suppressor of the variable impedance electron tube 68b of each circuit. The condenser 65a, and the condenser 65b, by their time delay characteristics, insure that each operating pulse, though simultaneously impressed on both branches of the circuit, can effect only a single reversal of the circuit, in the direction influenced by the suppressor potential. The time delay characteristics of the condenser circuits are such that the time taken for pulses to be transferred thereby is large in comparison with the effective duration of the operating pulse, but small relative to the interval between successive operating pulses.

Thus, when the circuit S2 is off and has a high suppressor potential, it may be turned on, but if on and if it has a low suppressor potential, it may be turned off, by the simultaneous pulsing of the grids of both tubes in the circuit. Assume, for instance, that S2 is off and its suppressor potential is high. With S2 off, tube 68a is fully conductive and tube 68b is at cut-off. The simultaneous pulsing of the grids of 68a and 68b, in view of the high suppressor potential of 68b, will start current flow in 68b while with 68a already fully conductive, no change in 68a will result from the pulsing of its grid. As 68b is reduced in impedance, a negative pulse is transferred by condenser 65a to the grid of 68b. The condenser discharge circuit has a time delay characteristic sufficient to prolong the negative pulse beyond the effective period of the positive operating pulse. In short, the generated negative pulse is made less sharp than the operating pulse and succeeds in increasing the negative grid bias of 68a, whereby the triggering action of the circuit from off to on state may be carried to completion in the manner already described. When S2 is in on state and its suppressor potential is low, the previously explained conditioning decrease in negative grid bias of 68a exists. Upon the positive pulsing of the inputs of the tubes 68a and 68b by an operating pulse, the tube 68a will be reduced further in negative grid bias sufficiently to start current flow therein. On the other hand, tube 68b already being at zero grid bias, the positive pulse applied thereto will have little or no effect. When tube 68a starts conducting, point 66b drops abruptly in potential and, hence, condenser 65b transfers a negative pulse to the grid of 68b, reducing its conductivity. This negative pulse outlasts the duration of the effective portion of the operating pulse, and in a manner previously described, the triggering of the circuit to its off state is carried to completion.

The commutator and its operation

As now understood, the commutator is composed of a number of stages, each comprised of the novel trigger circuit described above. There are three stages S1, S2, and S3 in the exemplification of the commutator. Stage S1 is coupled to stage S2 by a circuit including a resistor 70(1) connected between point 66b and S1 and line 51. The portion, of each resistor generally numbered 70, extending between point 82 and line 51 is shunted by a condenser 71. From point 82 of resistor 70(1) a wire 9 leads to the suppressor of pentode 68b of stage S2. Stage S2 is similarly coupled to stage S3 by a circuit which includes a resistor 70(2), shunted between its point 82 and line 51 by a condenser 71. The point 82 of this resistor is connected by a wire 10 to the suppressor of tube 68b of stage S3. Stage S3 is coupled to stage S1 by means including a polarity inverting circuit. This circuit includes a triode 78 connected in series with resistors 81 and 80 between lines 50 and 51. The grid of the triode 78 is connected through a resistance 79 to point 67b of stage S3. The output of triode 78 is connected to a resistor 70(3) which terminates at line 51 and is shunted below point 82 by a condenser 71. Point 82 of this resistor is connected by a wire 11 to the suppressor of tube 68b of stage S1. The potential of point 82 of resistor 70(1) is determined by the status of stage S1, that of point 82 of resistor 70(2) by the status of S2, and that of point 82 of 70(3) by the status of S3. When S1 is in the on state, point 66b is at its high potential and the potential at connected point 82 of 70(1) is correspondingly high. The potential of the suppressor of stage S2 is then at its high value, substantially equal to cathode potential, as explained in the preceding section. When stage S1 is in the off state, its point 66b is at low potential, then point 82 of 70(1) and the suppressor of S2 are at their low potential which is considerably negative with respect to the cathode potential. Thus, the status of S1 controls the potential of the suppressor in S2 and therethrough controls the conditioning of S2 for selective response to the operating pulses it is continually receiving from wire 54. In a similar manner, S2 controls the conditioning of S3. As for S3, when it is in the on status, its point 67b is substantially at cathode potential and the connected grid of tube 78 is at its high potential value in which the current flow through the tube is a maximum. Under this condition, the tube anode is at low potential, the connected point 82 of resistor 70(3) also is at low potential, and the suppressor, in S1, wired to this point is at its low potential. On the other hand, when S3 is in the off status, its point 67b is at negative potential with respect to the cathode of tube 78. Hence, the grid bias of tube 78 is then negative and current flow through the tube is at minimum. Under this condition, the point 82 of 70(3) is at high potential and the connected suppressor in S1 is then at its high potential.

It is seen that S1 when in on status develops high suppressor potential for tube 68b of S2 and that S2 when in the same status develops high suppressor potential for tube 68b of S3, but that S3 when in on status develops low suppressor potential for tube 68b of S1. Further, when S1 is in the off status, it develops low suppressor potential for S2, and when S2 is in off status, it develops low suppressor potential for S3, but S3, when in off status develops high suppressor potential for S1. Thus, the effect of S3 on S1 is the reverse of the effect of S1 on S2 or of S2 on S3. The reason for this will be made clear in the description of the cycles of operation of the commutator.

Assume all the stages S1, S2, and S3 are initially in off status in which the right hand branches are at low impedance while the left hand branches are at high impedance. This condition of the commutator will be visually indicated by the fact that all the glow discharge tubes 76b will be lit. At this time, therefore, all the points 66b and 67b are at their low potentials while all the points 66a and 67a are at their high potentials. Also, all the tubes 68a are in their fully conductive status while all the tubes 68b are at cut-off. Since the point 66b of S1 is at low potential, the point 82 of 70(1) and the connected suppressor of tube 68b of S2 are at their low potential. Hence, operating pulses received from wire 54 by the grid of tube 68b of S2 are ineffective at this time to unblock this tube and it remains at cut-off, as explained previously. Similarly, point 66b of S2 is at low potential, whereby point 82 of 70(2) and the suppressor of tube 68b of S3 are at low potential. Hence, the operating pulses received by the grid of tube 68b of S3 will be ineffective to unblock this tube. Thus, S2 and S3 will remain off. On the other hand, since S3 is off and its point 67b is at low potential, the inverting circuit including tube 78 produces high potential at point 82 of 70(3) and on the suppressor of the tube 68b of S1, as previously explained. Accordingly, with all the stages in their off status, the first stage is being conditioned by the last stage for switching to on status. However, there will be no alteration in status of any of the stages until switch 53 is first opened to cause the pulses on wire 54 to be of operating amplitude. Assume, then, that with the stages all off initially, the switch 53 is opened. Stage S1 is conditioned for reversal to on status and the first operating pulse received by the grid of tube 68b of S1 will trip S1 from off to on status in the manner described in the preceding section. This occurrence is indicated in Fig. 2 by the rise in the graph of potential of point 66b of S1 and the simultaneous drop in the graph of potential of point 66a of S1.

With S1 now on, and its point 66b at high potential, point 82 of 70(1) and the suppressor of tube 68b of S2 are at high potential. Accordingly, the next operating pulse will turn on S2, as indicated in Fig. 2. With S2 on, it conditions S3 to be turned on by the third pulse (see Fig. 2). The turning on of S3 completes one phase of a cycle of operation of the stages of the commutator. During this phase, the stages were sequentially turned on. Each stage when turned on conditioned the next stage to be turned on. From another viewpoint, the right hand branches were sequentially switched to high impedance condition while the left hand branches were sequentially switched to low impedance. The switching of the right hand branch of one stage to high impedance conditioned the right and left hand branches of the next stage to be brought to high and low impedance states, respectively.

Upon S3 being turned on as the last step in this phase of the commutator cycle, it operates through the inverting circuit to reduce the potential of point 82 of resistor 70(3) and of the suppressor of tube 68b of S1. Thereupon, tube 68b, of S1, which has been at minimum impedance is increased in impedance and point 66a rises a preparatory amount in potential. The occurrence of this conditioning increase in potential of point 66a of S1 simultaneously with the turning on of S3 is indicated in Fig. 2. The first operating pulse following the conditioning increase in potential of point 66a of S1 is effective to reverse the status of S1 in the manner described in the preceding section. Thus, as indicated in Fig. 2, the fourth operating pulse turns off S1. Upon S1 turning off, its point 66b drops in potential and the potential of point 82 of resistor 70(3) and of the suppressor of tube 68b in S2 drops to the low value. The resulting increase in impedance of the tube 68b of S2 and the accompanying rise in potential of point 66a of S2 is indicated in Fig. 2 and is seen to occur simultaneously with the turning off of stage S1. With the suppressor of 68b of S2 now at low potential, the fifth operating pulse turns off S2, whereupon there occurs the preliminary rise in potential of point 66a of S3, as indicated in Fig. 2. The sixth pulse turns off S3. With S3 off, the seventh pulse will again turn on S1, starting a new commutator cycle.

When the sixth pulse turned off S3, the second phase of the commutator cycle was ended. During this second phase, the stages were sequentially restored to off states and each when turned off conditioned the next to be turned off. From another viewpoint, in the second phase, the right hand impedance branches were sequentially brought to low impedance status while the left hand branches were brought in sequence to high impedance status. Each right hand branch when operated to low impedance conditioned the right and left hand branches of the next stage to be operated to low impedance and high impedance states, respectively.

It is now understood that the commutator will operate continuously to perform cycles. In each cycle, the stages will be operated sequentially to on status and then operated sequentially to off status. It is seen that the number of steps of operation performed in a cycle is twice the number of stages in the commutator but equal to the number of impedance branches in the commutator. Commutator operation may be interrupted by closing switch 53, reducing the amplitude of the pulses on wire 54 to ineffective value. The stages will stay in the states which they last assumed. Upon the reopening of switch 53, operation of the commutator resumes from the point where it left off.

In the sequential operation of the commutator, each operating pulse will be effective to trip only one stage of the commutator; i. e., that stage which has been conditioned for tripping action. Thus, with all the stages initially off, the stage S3 conditions S1 to be tripped on by an operating pulse. As S1 trips on, its point 66b rises in potential. This rise does not occur instantaneously with the upward sweep of the operating pulse but occurs exponentially, as may be understood from Fig. 2. As point 66b of S1 rises in potential, there is a resulting rise in potential of point 82 of resistor 70(1). The rise in potential of this point 82 lags somewhat behind the rise in potential of point 66b because of the condenser 71 connected between point 82 and line 51. For these two reasons; one, the exponential rise of potential of point 66b of S1 as S1 is tripped on and two, the lagging rise in potential of point 82 of resistor 70(1), the suppressor potential of tube 68b of S2 does not reach effective high value during the effective period of the operating pulse. From another viewpoint, the operating pulse, which not only is acting on S1 but also on S2, is at least on its down sweep while the suppressor of 68b of S2 is on its up sweep of potential. These two effects counteract each other, so that the same operating pulse which initiated the tripping of S1 to on status is not effective to initiate the tripping of S2 to on state. In this manner, each operating pulse, in the sequential operation of the commutator, may trigger on only one stage which in turn effects the conditioning of the next stage.

Likewise, in sequential operation of the commutator, each operating pulse may trip off only one stage which in turn conditions the next stage. Assume that S2 and S3 are in on state and S1 is in off state; hence, the suppressor potential of 68b of S2 is low, while that of 68b of S3 is high. The next operating pulse initiates the tripping of S2 to off state by supplementing the preliminary reduction in negative grid bias of tube 68a of S2. As shown in Fig. 2, the point 66b of S2 drops substantially instantaneously in potential, but the condenser 71 shorting a portion of resistor 70(2) tends to maintain point 82 of 70(2) at its previous high value. As the condenser charge decays, point 82 exponentially drops in potential to its lower value. The potential of the connected suppressor of tube 68b of S3 similary drops exponentially. Thus, the suppressor potential of 68b of S3 does not reach effective low value during the effective period of the operating pulse which tripped off S2 and which also was applied to S3. In other words, the conditioning increase in impedance of 68b of S3 is completed only after the operating pulse has virtually ceased to exist. For this reason, in the sequential operation of the commutator, each operating pulse may turn off only one stage.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical system including a pair of sequentially related electronic trigger circuits, each having a pair of impedance branches cross-coupled to sustain the circuit in either of two, alternative electrical states and selectively conditionable for reversal from either state to the other in response to an applied pulse, means for coupling the preceding one of the circuits to only a single conditioning portion of the following circuit to act through this portion to condition the following circuit selectively for reversal from one state to the other or vice versa depending on the state of the preceding circuit, and means for applying a pulse to the following circuit to reverse it selectively from either state to the other in accordance with the selective conditioning of this following circuit.

2. An electrical system including a pair of sequentially related electronic trigger circuits, each having parallel impedance networks, with electronic discharge means, cross-coupled to sustain the circuit in either of two, alternate stable states, means for applying tripping pulses continually to the electronic discharge means of each circuit, and means for coupling the preceding one of the trigger circuits to only one impedance network of the following one of the circuits to act through this network to selectively condition the following circuit for subsequent tripping by a tripping pulse from one state to the other or alternatively from the latter state to the former state, depending on the state existing in the preceding circuit.

3. An electronic commutator including a closed ring of electronic trigger circuits, each comprising parallel, cross-coupled impedance networks to sustain the circuit in a given electrical status or a reverse status, each network including a variable impedance electronic discharge tube unit containing a control grid, the tube unit in one of the networks in each circuit also including a supplemental grid, means so coupling the circuits to one another that each circuit except the last when in given status or reverse status produces low or high potential, respectively, for the supplemental grid of the tube unit in the next circuit while the last circuit in given or reverse status produces high or low potential, respectively for the supplemental grid of the tube unit in the first circuit, means for applying electrical pulses continually to the control grids of all the tubes in all the circuits, one said pulse being effective when all the circuits are in given state to render the tube unit, in the first circuit, containing the supplemental grid, then at high potential, conductive so as to trip the first circuit to reverse status, whereupon the supplemental grid in the second circuit is brought to high potential to prepare the second circuit to be tripped to reverse status by the next pulse and so on sequentially until the last circuit is tripped to reverse status, whereupon the potential on the supplemental grid in the first circuit is reduced, causing the conductivity of its tube unit to drop and through the cross-coupling to produce a preparatory rise in potential of the control grid in the other tube unit of the first circuit, whereupon the next pulse received by the control grid trips the first circuit back to given status, in consequence of which the supplemental grid in the second circuit is reduced to prepare the second circuit to be tripped back to given status, and so on, so that the circuits are sequentially tripped to reverse status and then sequentially tripped to given status in repetitive cyclical manner.

4. An electrical system including a pair of sequentially related trigger circuits, each having parallel impedance networks for sustaining the circuit in either of two stable states, each such network including an electron tube unit with a control electrode, means for applying pulses continually to the control electrodes of both networks of both circuits, one of said tube units in each circuit also containing a supplemental control electrode, and means for coupling the preceding one of the circuits to the supplemental control electrode of the following one of the circuits so as to apply high or low potential to this supplemental electrode depending on whether the preceding circuit is in one stable state or the other, said supplemental electrode when at high potential preparing its containing tube, when at cut-off, to be rendered conductive in response to a pulse received by the control electrode of this tube, thereby to initiate tripping of this following circuit to one stable state, this supplemental electrode when subsequently reduced in potential upon reversal in state of the preceding circuit reducing the conductivity of its containing tube, whereupon the tube in the other network of the following circuit is conditioned to be rendered conductive in response to a pulse applied to this tube, so as to trip this following circuit back to its previous state.

5. An electrical system including an electronic trigger circuit having one stable state or an alternate stable state and comprising a pair of parallel impedance networks cross-coupled to sustain the circuit in either of the states to which it is tripped, each network including an electron tube with a pulse receiving grid, means for transmitting tripping pulses simultaneously to the pulse receiving grids of both tubes, one of said tubes also including a conditioning grid which may be alternatively at high or low potential in a sustained state of the trigger circuit and which when at high potential and with the circuit in one said state conditions the circuit to be tripped to the alternate state by a tripping pulse and which when at low potential and with the circuit in the alternate state conditions the circuit to be tripped from the alternate state to the other state, and means for selectively applying high or low potential to the conditioning grid to select the state to which the circuit is to be tripped.

6. An electrical system including voltage supply lines of opposite polarity, an electronic trigger circuit arrangement powered by said lines and including a pair of electron tubes with parallel anode-cathode circuits across said lines, each tube having a grid coupled to the anode-cathode circuit of the other tube, whereby either tube when conductive sustains the other tube at negative cut-off grid bias, one of said tubes including a conditioning electrode which when at high potential preliminarily conditions this tube, if at cut-off, to be rendered conductive in response to a reduction in its negative grid bias and which when at low potential and its tube conductive reduces the current flow in this tube so as to reduce the negative grid bias of the other tube in order to preliminarily condition it to be rendered conductive, means for selectively applying high or low potential to the conditioning electrode, and means for applying positive pulses to the grids to render that one of the tubes conductive which has been preliminarily conditioned for such operation, said tube when rendered conductive bringing about a reversal in status of the trigger circuit arrangement.

7. An electrical system including an electronic trigger circuit arrangement comprising a pair of electron tubes with parallel anode-cathode circuits each tube having a grid coupled to the anode-cathode circuit of the other tube, whereby when either tube is in conductive condition, it sustains the other tube at cut-off bias, means for transmitting operating pulses simultaneously to both grids tending to drive the tube at cut-off to a conductive condition in order to reverse the status of the trigger arrangement, and a switching circuit for effecting a preliminary reduction in conductivity of one of the tubes from a highly conductive condition and thereby to reduce the negative grid bias of the other tube sufficiently to allow a positive operating pulse to be effective to drive the latter tube to conductive condition so as to reverse the state of the trigger arrangement.

ARTHUR H. DICKINSON.

REFERENCES CITED

The following references are of record in the file of this patent:

UNITED STATES PATENTS

| Number | Name | Date |
| --- | --- | --- |
| 2,306,386 | Hollywood | Dec. 29, 1942 |
| 2,308,778 | Prince, Jr. | Jan. 19, 1943 |
| 2,411,714 | De Rosa | Nov. 26, 1946 |

OTHER REFERENCES

Electronics, August 1939 pp. 14–17, "Trigger Circuits," by Reich.